(12) United States Patent
Ichimura et al.

(10) Patent No.: US 6,274,235 B1
(45) Date of Patent: Aug. 14, 2001

(54) SURFACE-PROTECTIVE PRESSURE-SENSITIVE ADHESIVE SHEET AND PRESSURE-SENSITIVE ADHESIVE COMPOSITION FOR SURFACE-PROTECTIVE PRESSURE-SENSITIVE ADHESIVE SHEET

(75) Inventors: Syuji Ichimura; Yoshinaga Tsuzuki; Kinnosuke Hino; Mikihiro Endo; Kazuhiro Kono, all of Tokyo (JP)

(73) Assignee: Nichiban Company Limited, Tokyo (JP)

( * ) Notice: Subject to any disclaimer, the term of this patent is extended or adjusted under 35 U.S.C. 154(b) by 0 days.

(21) Appl. No.: 09/341,088
(22) PCT Filed: Oct. 26, 1998
(86) PCT No.: PCT/JP98/04821
§ 371 Date: Jun. 30, 1999
§ 102(e) Date: Jun. 30, 1999
(87) PCT Pub. No.: WO99/23186
PCT Pub. Date: May 14, 1999

(30) Foreign Application Priority Data

Oct. 31, 1997 (JP) .................................................. 9-300081
Nov. 25, 1997 (JP) .................................................. 9-322574

(51) Int. Cl.⁷ .................................. C09J 7/02; C09J 7/00; C09J 7/04
(52) U.S. Cl. ..................................... 428/343; 428/355 EN; 428/356; 428/516; 428/517
(58) Field of Search ............................ 428/343, 355 EN, 428/356, 516, 517

(56) References Cited

FOREIGN PATENT DOCUMENTS

| 01275029 | * | 4/1988 | (JP) . |
| 6-336577 | | 12/1994 | (JP) . |
| 7-233354 | | 9/1995 | (JP) . |
| 9-085824 | * | 3/1997 | (JP) . |
| 9-94532 | | 4/1997 | (JP) . |

OTHER PUBLICATIONS

International Search Report for PCT/JP98/04821, citing BA–BC listed above, completed on Jan. 20, 1999 and mailed Jan. 26, 1999.

* cited by examiner

*Primary Examiner*—Daniel Zirker
(74) *Attorney, Agent, or Firm*—David G. Conlin; Dike, Bronstein, Roberts, & Cushman Intellectual Property Group

(57) ABSTRACT

The present invention is to provide a pressure-sensitive adhesive sheet for surface protection, which has a substrate containing an ethylene/propylene copolymer and an ethylene/1-butene copolymer in a weight ratio of 60:40 to 90:10, and an adhesive composition for pressure-sensitive adhesive sheets for surface protection, which contains 5 to 30 parts by weight of a rosin resin tackifier based on 100 parts by weight of a blend comprising 50 to 100% by weight of a polyisobutylene and/or a butyl rubber and 50 to 0% by weight of a polybutene.

9 Claims, No Drawings

SURFACE-PROTECTIVE PRESSURE-SENSITIVE ADHESIVE SHEET AND PRESSURE-SENSITIVE ADHESIVE COMPOSITION FOR SURFACE-PROTECTIVE PRESSURE-SENSITIVE ADHESIVE SHEET

TECHNICAL FIELD

The present invention relates to a pressure-sensitive adhesive sheet for surface protection and an adhesive composition therefor, and more particularly to a pressure-sensitive adhesive sheet for surface protection for protecting coats which is excellent in strength at low temperature and high-speed removal property, and an adhesive composition therefor which is excellent in low temperature adhesive property to coats and high-speed removal property.

BACKGROUND ART

Conventional methods for protecting surfaces of top coats formed as finish coatings on the surfaces of vehicles include coating thinly with paraffin wax. However, this method involves a problem that it does not exhibit sufficient protecting function and it costs much time and labor when the paraffin wax coating is to be removed, in addition that the effluent, which occurs at the time of the removal, causes environmental pollution, etc.

Meanwhile, there is a method for applying directly a pressure-sensitive adhesive sheet for surface protection to surfaces of coats, such as shown in Japanese Provisional Patent Publication Nos. 73352/1994 and 3420/1997, and however, these adhesive sheets are poor in adhesive property, particularly at low temperature, to coats having hardly adhesive property which is excellent in water repellency and stain resistance, and, since the tear strength and the tensile elongation are small, it has problems that the surface protective adhesive sheets have entirely peeled off at the time of wheels transport in winter season or it has partially peeled because of partial tear or cut.

On the other hand, as a pressure-sensitive adhesive sheet for protecting coats which has good low-temperature properties, proposed is a pressure-sensitive adhesive sheet for surface protection having an adhesive layer in which the main component is a hydrogenated random copolymer of styrene and diene series hydrocarbon (Japanese Provisional Patent Publication No. 149631/1994). Further, proposed is a pressure-sensitive adhesive sheet for protecting coats in which an adhesive containing as main component at least one of a polyisobutylene, a butyl rubber and a polybutene has been applied on a substrate (Japanese Provisional Patent Publication No. 143829/1996). However, although such sheets never peel at the time of wheels transport, there are problems that they are easily cut or torn because of high removal strength at the time of high-speed removal. Alternatively, since it must be removed at low-speed, there are problems that it makes the removal workability worse and it has left stains on surfaces of coats through the influence of tackifier.

The purpose of the present invention is to provide a pressure-sensitive adhesive sheet for surface protection which exhibits good applicability to adhesive-retarded coats having high water repellency and stain resistance, which never peels due to partial tear or cut even at low temperature, which is excellent in protection properties within a broad temperature range, and also which can be easily removed at high-speed without tear or cut at the time of removing.

Further, the purpose of the invention is to provide an adhesive for a pressure-sensitive adhesive sheet for surface protection at low temperature, which is excellent in adhesive property, particularly at low temperature, to adhesive-retarded coats having high water repellency and stain resistance, and which can easily be removed at high-speed without contaminating surfaces of adherends or leaving stains thereon at the time of the removal.

DISCLOSURE OF THE INVENTION

The present invention is to provide to a pressure-sensitive adhesive sheet for surface protection, which has a substrate containing an ethylene/propylene copolymer and an ethylene/1-butene copolymer at 60:40 to 90:10 (in terms of weight ratio).

Further, the present invention is to provide a pressure-sensitive adhesive sheet for surface protection, wherein the tensile strength at −20° C., the tensile elongation at −20° C. and the Elmendorf tear strength at 5° C. in the crosswise and the lengthwise directions are 1.5 N/mm or more, 100% or more and 0.5 N or more, respectively, and the elastic modulus at 23° C. in the lengthwise direction is 300 to 500 N/mm$^2$.

Furthermore, the present invention is to provide the pressure-sensitive adhesive sheet for surface protection, wherein the light transmittance of the substrate at 200 to 400 nm is 0.5% or less.

Further, the present invention is to provide an adhesive composition for pressure-sensitive adhesive sheets for surface protection, which contains 5 to 30 parts by weight of a rosin resin tackifier based on 100 parts by weight of a blend comprising 50 to 100% by weight of a polyisobutylene and/or a butyl rubber and 50 to 0% by weight of a polybutene.

BEST MODE FOR CARRYING OUT THE INVENTION

The substrate layer of the pressure-sensitive adhesive sheet for surface protection of the present invention contains an ethylene/propylene copolymer and an ethylene/1-butene copolymer at a weight ratio of 60:40 to 90:10, preferably 75:25 to 85:15. When the amount of the ethylene/1-butene copolymer is more than 40% by weight, the application workability and the removal workability make worse. On the other hand, when the amount of the ethylene/1-butene copolymer is less than 10% by weight, it tends to be easily torn or cut since the tear strength and the elongation at low temperature falls down, and the protection function becomes worse because of partial peel at the time of low temperature transport, and the removal workability becomes worse. In addition, the fittability on uneven portions and curved portions of adherends also becomes worse.

The ethylene/propylene copolymer to be used in the present invention is a block copolymer or a random copolymer and is in general called "block polypropylene" or "random polypropylene" which contains ethylene from the polymerization step. Such ethylene/propylene copolymer may preferably be such a polymer that a melt flow rate (measured according to ASTM D1238, hereinafter abbreviated to "MER") is 0.5 to 5 g/10 min. at 230° C. under a load of 2.16 kg. Commercially available products of the ethylene/propylene copolymer employable for the present invention include, for example, NOBLEN BJS-M (TM, available from Grand Polymer Co., Ltd.), GRANDPOLYPRO J702L (TM, available from Grand Polymer Co., Ltd.).

The ethylene/1-butene copolymer to be used for the present invention may preferably be such a polymer that MFR (determined in accordance with JIS K-7201) is 0.1 to 20 g/10 min. at 190° C. under a load of 2.16 kg. The weight ratio of ethylene and 1-butene includes, for example, 75:25 to 85:15. Commercially available products of the ethylene/1-butene copolymer employable for the present invention include, for example, JSR EBM 2011P (TM, available from Japan Synthetic Rubber Co., Ltd.), EXCELEN N0391 (TM, available from Sumitomo Chemical Co., Ltd.).

Further, the substrate layer of the pressure-sensitive adhesive sheet for surface protection of the present invention may preferably be such a layer that the light transmittance at 200 to 400 nm is 0.5% or less, from the viewpoint of weathering resistance. In order to adjust the light transmittance at 200 to 400 nm to 0.5% or less, a method of adding titanium oxide, an ultraviolet light absorber, an ultraviolet light stabilizer, etc., to the layer may be exemplified.

In the case of adding titanium oxide to the substrate layer, it may be preferable to add 3 to 15 parts by weight of titanium oxide to 100 parts by weight of the total amounts of an ethylene/propylene copolymer and an ethylene/1-butene copolymer.

In the case of adding an ultraviolet light absorber or an ultraviolet light stabilizer to the substrate layer, a benzotriazole type-, hindered amine type-, benzoate type-compounds, etc., may be exemplified as its type. These ultraviolet light absorber or ultraviolet light stabilizer may preferably be added in an amount of 0.3 parts by weight based on 100 parts by weight of the ethylene/propylene copolymer and the ethylene/1-butene copolymer.

The substrate layer of the pressure-sensitive adhesive sheet for surface protection of the present invention may, if necessary, be incorporated with various additives, as far as the purpose of the present invention is not impaired. For example, a pigment such as carbon black and red iron oxide; a filler such as talc and calcium carbonate; a lubricant such as stearic acid, stearic acid amide, calcium stearate, barium stearate and zinc stearate; an antioxidant such as phenol type-, phosphite type- and thioether type-antioxidants; inorganic hollow particles such as glass balloon and silica balloon; a microspherical polymer such as a high-molecular-weight polyolefin powder; and a releasant such as silicone type- and long-chain alkyl type-releasants, can be added if necessary.

The substrate layer of the present invention can be prepared by common methods such as T-die extrusion and blown-film extrusion.

Although the adhesive layer of the pressure-sensitive adhesive sheet for surface protection of the present invention is not particularly limited, the above-mentioned adhesive composition for the pressure-sensitive adhesive sheet for surface protection of the present invention may preferably be used. Such a composition includes a composition in which a rosin resin tackifier has been added to a blend comprising a polyisobutylene or a butyl rubber or a polybutene therewith because the composition exhibits good adhesive property at low temperature. In particular, the composition has been added 5 to 30 parts by weight of the tackifier to 100 parts by weight of a blend comprising 50% by weight or more of a polyisobutylene or a butyl rubber and 50% by weight or less of a polybutene.

In the adhesive composition of the present invention, when the content of a polybutene in a blend consisting of a polyisobutylene and/or a butyl rubber and a polybutene exceeds 50% by weight, removal workability becomes worse because removal strength at the time of high-speed removal becomes high, and weathering resistance becomes worse.

The polyisobutylene and/or a butyl rubber to be used for the present invention may preferably be one where the viscosity-average molecular weight determined in accordance with Flory method is 400,000 to 1,500,000. If the viscosity-average molecular weight is less than 400,000, removal strength at the time of high-speed removal becomes high and removal workability becomes worse. If the viscosity-average molecular weight exceeds 1,500,000, the adhesive property at low temperature to hardly adhesive coats becomes worse.

The polybutene to be used for the present invention may preferably be one where the number-average molecular weight is 400 to 3,000. If the number-average molecular weight is less than 400, the removal strength at the time of high-speed removal becomes high and removal workability becomes worse. If the number-average molecular weight exceeds 3,000, the adhesive property at low temperature to hardly adhesive coats becomes worse.

In the adhesive composition of the present invention, if the added amount of the rosin resin tackifier to 100 parts by weight of a blend comprising a polyisobutylene and/or a butyl rubber and a polybutene is less than 5 parts by weight, the adhesive property at low temperature to hardly adhesive coats becomes worse. If the added amount of the rosin resin tackifier exceeds 30 parts by weight, the adhesive property at low temperature and the weathering resistance become worse and it may contaminate surfaces of adherends.

The rosin resin tackifier to be used for the present invention may preferably be a rosin ester resin, more preferably a hydrogenated or disproportionated rosin ester resin, from the viewpoint of weathering resistance.

The pressure-sensitive adhesive sheet for surface protection using in the adhesive composition of the present invention may preferably be such a sheet that the adhesive strength at −20° C. atmosphere (180° peel strength, removal rate 0.3 m/min, determined in accordance with JIS Z0237) is 0.4 N/10 mm or more and the removal strength at high-speed at 23° C. atmosphere (180° peel strength, pre-treatment 70° C.×24 hours, removal rate 40 m/min, determined in accordance with JIS Z0237) is less than 2 N/10 mm, to hardly adhesive coats where wetting property (determined in accordance with JIS K6760) is less than 30 dyn/cm. When the adhesive property at −20° C. atmosphere is less than 0.4 N/10 mm, it tends to easily peel at the time of low temperature transport because the adhesive property at low temperature becomes poor. When the adhesive strength at high-speed at 23° C. atmosphere is 2 N/10 mm or more, the removal workability may become sometimes worse.

The adhesive composition for forming the adhesive layer of the pressure-sensitive adhesive sheet of the present invention may, if necessary, be incorporated with various additives, as far as the purpose of the-present invention is not impaired. For example, a softening agent such as oil, paraffin wax, an epoxy plasticizer, a polyester plasticizer; a pigment such as titanium oxide, carbon black and red iron oxide; a filler such as talc and calcium carbonate; a lubricant such as stearic acid, stearic acid amide, calcium stearate, barium stearate and zinc stearate; an antioxidant such as phenol type-, phosphite type- and thioether type-antioxidants; an ultraviolet absorber or stabilizer such as benzotriazole type-ultraviolet absorber, hindered amine type-ultraviolet stabilizer and benzoate type-ultraviolet stabilizer; inorganic hollow particles such as glass balloon and silica balloon; a microspherical polymer such as acrylic microsphere and a high-molecular-weight polyolefin powder; and a releasant such as silicone type- and long-chain alkyl type-releasants, can be added if necessary.

The pressure-sensitive adhesive sheet for surface protection of the present invention is such a sheet that, in both of the crosswise and the lengthwise directions, the tensile strength and the tensile elongation at −20° C. are 1.5 N/mm or more and 100% or more, respectively, the Elmendorf tear strength at 5° C. is 0.5 N or more, and the elastic modulus at 23° C. in the lengthwise direction is 300 to 500 N/mm$^2$. When the tensile strength at −20° C. is less than 1.5 N/mm, the tensile elongation at −20° C. is less than 100%, or the Elmendorf tear strength at 5° C. is less than 0.5 N, it tends to easily be torn or cut, and it becomes to exhibit poor protection function because of partial peel at the time of low-temperature transport, and removal workability at low temperature becomes worse. Further, when the elastic modulus at 23° C. is less than 300 N/mm$^2$, the application and removal workabilities become worse because it is too soft. When the elastic modulus exceeds 500 N/mm$^2$, fittability to uneven portions and curved portions of adherends become worse.

The pressure-sensitive adhesive sheet for surface protection of the present invention can be manufactured by known methods, for example, filming the substrate layer followed by applying the adhesive layer thereto by means of solution coating or heat melt extrusion, or co-extruding the substrate and adhesive layers. The thickness of the substrate layer may preferably be 20 to 200 μm, more preferably 30 to 100 μm. The thickness of the adhesive layer may preferably be 2 to 80 μm, more preferably 5 to 30 μm.

EXAMPLES

The present invention will be explained in more detail by referring to Examples, but it should never be limited to these Examples.

Components employed are as follows:
(1) an ethylene/propylene copolymer (hereinafter abbreviated to "EPP")
   EPP-1: NOBLEN BJS-M™ (an ethylene/propylene copolymer manufactured by Grand Polymer Co., Ltd.), MFR=1.5 g/10 min. (at 230° C. under a load of 2.16 kg)
(2) a polypropylene (hereinafter abbreviated to "HPP")
   HPP-1: IDEMITSU POLYPRO F-200S™ (a polypropylene manufactured by Idemitsu Petrochemical Co., Ltd.)
(3) an ethylene/1-butene copolymer (hereinafter abbreviated to "EBM")
   EBM-1: JSR EBM 2011P™ (an ethylene/1-butene copolymer manufactured by Japan Synthetic Rubber Co., Ltd.), MFR=0.5 g/10 min. (at 190° C. under a load of 2.16 kg)
(4) titanium oxide (hereinafter abbreviated to "TIO")
   TIO-1: TIPAQUE A220™ (titanium oxide manufactured by Ishihara Sangyo Kaisha, Ltd., anatase type)
(5) an ultraviolet stabilizer (hereinafter abbreviated to "HLS")
   HLS-1: TINUVIN 622LD™ (hindered amine ultraviolet stabilizer manufactured by Ciba Specialty Chemicals Inc.)
(6) an antioxidant (hereinafter abbreviated to "AO")
   AO-1: IRGANOX 1010™ (hindered phenol antioxidant manufactured by Ciba Specialty Chemicals Inc.)
   AO-2: IRGANOX 565™ (hindered phenol antioxidant manufactured by Ciba Specialty Chemicals Inc.)
(7) a polyisobutylene (hereinafter abbreviated to "PIB")
   PIB-1: VISTANEX MML80™ (a polyisobutylene manufactured by Exxon Corporation, viscosity-average molecular weight 990, 000)
(8) a polybutene (hereinafter abbreviated to "PB")
   PB-1: IDEMITSU POLYBUTENE 300R™ (a polybutene manufactured by Idemitsu Petrochemical Co., Ltd., number-average molecular weight 1,330)
(9) an adhesive resin tackifier (hereinafter abbreviated to "AR")
   AR-1: PINECRYSTAL KE-311™ (a rosin ester resin manufactured by Arakawa Chemical, Inc.)
   AR-2: CLEARON P-85™ (a hydrogenated terpene resin manufactured by Yasuhara Chemical KK.)
   AR-3: ARKON P-100™ (a saturated alicyclic hydrocarbon resin manufactured by Arakawa Chemical, Inc.)
   AR-4: YS POLYSTAR T115™ (a terpene phenol resin manufactured by Yasuhara Chemical KK.)

Examples 1–2 and Comparative Examples 1–3

In accordance with each of compositions as shown in Table 1, on a substrate layer which has been filmed to 60 μm thickness by T-die extruder, an adhesive layer was solution-coated, while using a toluene solvent, to be the thickness of 10 μm.

TABLE 1

| | Substrate layer | | | | | | Adhesive layer | | | | |
|---|---|---|---|---|---|---|---|---|---|---|---|
| | EPP | HPP | EBM | TIO | HLS | AO | blend | | AR | HLS | AO |
| | EPP-1 | HPP-1 | EBM-1 | TIO-1 | HLS-1 | AO-1 | PIB-1 | BP-1 | AR-1 | HLS-1 | AO-1 |
| Example 1 | 80 | | 20 | 7 | 0.05 | 0.05 | 80 | 20 | 10 | 0.5 | 0.5 |
| Example 2 | 70 | | 30 | 7 | 0.05 | 0.05 | 100 | | 20 | 0.5 | 0.5 |
| Comparative example 1 | 100 | | | 7 | 0.05 | 0.05 | 80 | 20 | 10 | 0.5 | 0.5 |
| Comparative example 2 | 50 | | 50 | 7 | 0.05 | 0.05 | 80 | 20 | 10 | 0.5 | 0.5 |
| Comparative example 3 | | 80 | 20 | 7 | 0.05 | 0.05 | 80 | 20 | 10 | 0.5 | 0.5 |

With respect to pressure-sensitive adhesive sheets for surface protection manufactured in accordance with Examples 1–2 and comparative examples 1–3, their mechanical properties, adhesive properties, utility and weathering resistance were evaluated. Further, the light transmittance of the substrate layer films to which the adhesives have not been applied was also evaluated.

(1) Mechanical Properties Evaluation

Tensile strength, elongation, modulus of elasticity; initial sample length=50 mm, rate of pulling=0.3 m/min. (in accordance with JIS K7113).

Elmendorf tear strength; in accordance with JIS P8116.

(2) Adhesive Property Evaluation

Adhesive strength to coats; 180° peel strength, adherend=a hardly adhesive coat, rate of peeling=0.3m/min. (in accordance with JIS K0237).

Removal strength from coats at high-speed; 180° peel strength, adherend=a hardly adhesive acrylic coat, rate of peeling=40m/min., pretreatment 70° C.×24 hours (in accordance with JIS K0237).

(3) Utility Evaluation

Application workability; evaluate workability at the time of applying a sample to a finished car on which a hardly adhesive acrylic paint has been coated.

Removal workability; evaluate workability at the time of removing by hands, following the application of the sample to a finished car on which a hardly adhesive acrylic paint has been coated and then pretreatment of 70° C.×24 hours.

Adhesive property at low temperature; evaluate as to whether or not peel occurs, following the application of a sample to a finished car on which a hardly adhesive acrylic paint has been coated and then execution of running test at the rate of 100 km/hr.

Substrate breaking at low temperature; evaluate as to whether or not substrate breaking occurs at the time of removing it by hands, following the application of a sample to a finished car on which a hardly adhesive acrylic paint has been coated and then the pretreatment of 70° C.×24 hours (4) Weathering Resistance Evaluation Light transmittance of a substrate; determine the light transmittance of a substrate layer film at 200 to 400 nm.

re-removablity; adherend=a hardly-adhesive acrylic coat, remove by hands after carbon-arc exposure, good, easily removable, bad, difficult to remove.

(5) Remarks

Coats; a hardly adhesive acrylic coat (containing silicon) where wetting property is less than 30 dyn/cm (determined in accordance with JIS K6768).

Carbon-arc exposure; employing sunshine weatherometer, 300 hours exposure (rain 60 hours).

Test Results

Test results are shown in Table 2.

TABLE 2

| | Mechanical properties evaluation | | | | | | | Adhesion property evaluation | |
|---|---|---|---|---|---|---|---|---|---|
| | Temp. | | | | | | | | |
| | −20° C. | | | | 5° C. | | 23° C. | −20° C. | 23° C. |
| | Tested item | | | | | | | | |
| | Tensile strength (N/10 mm) | | Tensile elongation (%) | | Elmendorf tear strength (N) | | Elastic modulus (N/mm$^1$) | Adhesive strength to coat (N/10 mm) | Peel strength (N/10 mm) |
| | Tested direction | | | | | | | | |
| | Length-wise direction | cross-wise direction | Length-wise direction | cross-wise direction | Length-wise direction | cross-wise direction | Length-wise direction | Length-wise direction | Length-wise direction |
| Example 1 | 24 | 20 | 330 | 310 | 2.7 | 2.6 | 400 | 1.5 | 1.3 |
| Example 2 | 24 | 26 | 320 | 390 | 2.2 | 7.1 | 370 | 0.8 | 1.2 |
| Comparative example 1 | 27 | 24 | 10 | 10 | 0.3 | 1.1 | 550 | 1.1 | 1.2 |
| Comparative example 2 | 33 | 23 | 510 | 480 | 3.8 | 7.0 | 170 | 1.9 | 0.8 |
| Comparative example 3 | 15 | 13 | 70 | 150 | 0.8 | 2.2 | 400 | 1.4 | 1.2 |

| | Utility evaluation | | | | Weathering resistance evaluation | |
|---|---|---|---|---|---|---|
| | Temp. | | | | | |
| | 23° C. | | −20° C. | | 23° C. | |
| | Application workability | Removal workability | Adhesive property at low temp. | Substrate breaking at low temp. | Light transmittance of substrate layer (%) | re-removability |
| Example 1 | good | good | good | not occured | 0.1 | good |
| Example 2 | good | good | good | not occured | 0.1 | good |
| Comparative example 1 | poor | good | good | occured | 0.1 | good |

TABLE 2-continued

| | | | | | | |
|---|---|---|---|---|---|---|
| Comparative example 2 | poor | poor | good | not occured | 0.1 | good |
| Comparative example 3 | good | good | good | occured | 0.1 | good |

As is clear from Examples 1–2 in Table 2, the pressure-sensitive adhesive sheet for surface protection of the present invention exhibits good protection function to a hardly adhesive coat at both of normal and low temperatures, and has never peeled partially or completely by cut or tear at the time of low-temperature transport, and further has good application workability, removal workability and weathering resistance and therefore is easily removable at high-speed without cut or tear even if it is removed after carbon-arc exposure.

Examples 3–8 and Comparative Examples 4–11

Each of adhesive compositions as shown in Table 3 was dissolved in a toluene solvent, followed by coating the solution on one surface of the similar film as used in Example 1, to the thickness of 10 μm.

TABLE 3

| | Blend | | | | | | | UV-stabilizer | Anti-oxidant |
|---|---|---|---|---|---|---|---|---|---|
| | PIB | IIR | PB | Tackifier | | | | | |
| | PIB-1 | IIR-1 | PB-1 | AR-1 | AR-2 | AR-3 | AR-4 | HLS-1 | AO-2 |
| Example 3 | 80 | | 20 | 10 | | | | 0.5 | 0.5 |
| Example 4 | 80 | | 20 | 25 | | | | 0.5 | 0.5 |
| Example 5 | 100 | | 0 | 20 | | | | 0.5 | 0.5 |
| Example 6 | 60 | | 40 | 20 | | | | 0.5 | 0.5 |
| Example 7 | 40 | 40 | 20 | 20 | | | | 0.5 | 0.5 |
| Example 8 | | 80 | 20 | 20 | | | | 0.5 | 0.5 |
| Comparative example 4 | 100 | | 0 | 0 | | | | 0.5 | 0.5 |
| Comparative example 5 | 80 | | 20 | 0 | | | | 0.5 | 0.5 |
| Comparative example 6 | 80 | | 20 | 40 | | | | 0.5 | 0.5 |
| Comparative example 7 | 40 | | 60 | 20 | | | | 0.5 | 0.5 |
| Comparative example 8 | | | 100 | 20 | | | | 0.5 | 0.5 |
| Comparative example 9 | 80 | | 20 | | 20 | | | 0.5 | 0.5 |
| Comparative example 10 | 80 | | 20 | | | 20 | | 0.5 | 0.5 |
| Comparative example 11 | 80 | | 20 | | | | 20 | 0.5 | 0.5 |

Pressure-sensitive adhesive sheets for surface protection manufactured in accordance with Examples 3–8 and comparative examples 4–11 were applied to a hardly adhesive acrylic coat to test about the adhesive property to the adherend at low temperature, removability at high-speed and the weathering resistance. Incidentally, as to weathering resistance, the re-removability and the occurrence of contamination or stains on the surface of the adherend after removal, at the time of post-exposure of carbon-arc, were evaluated.

Hardly adhesive coat: a hardly adhesive acrylic coat (containing silicone) whose wetting property is less than 30 dyn/cm (determined in accordance with JIS K6760).

Carbon-arc exposure; 300 hours carbon-arc exposure by sunshine weatherometer (rain 60 hours).

Adhesive property at low temperature: determining 180° peel strength at −20° C. atmosphere (adherend=a hardly adhesive acrylic coat, rate of peeling=0.3 m/min, in accordance with JIS Z0237), evaluation results: good - - - 0.4 N/10 mm or more, poor - - - less than 0.4 N/10 mm (set up from the results as to whether or not peel occurs, following the application of a pressure-sensitive adhesive sheet sample for surface protection to a finished car on which a hardly adhesive acrylic paint has been coated and then the execution of running test at the rate of 100 km/hr at −20° C. atmosphere).

Removal property at high-speed: determining 180° peel strength at 23° C. atmosphere (adherend=a hardly adhesive acrylic coat, rate of peeling=40 m/min, in accordance with JIS Z0237), evaluation results: good - - - less than 2 N/10 mm, poor - - - 2 N/10 mm or more (determined from the evaluation results as to removal workability, after the application of a pressure-sensitive adhesive sheet sample for surface protection to a finished car on which a hardly adhesive acrylic paint has been coated).

Re-removability; removing by hands at 23° C. atmosphere after carbon-arc exposure, evaluation results: good - - - easily removable, poor - - - difficult to remove, contamination and stains on adherend: following the evaluation of the removability at high-speed, evaluating visually adherends after the re-removability evaluation.

The test results are shown in Table 4.

TABLE 4

| | | No exposure | | 300 h (rain 60 h) exposure | |
|---|---|---|---|---|---|
| | Adhesive property at low temp. | High-speed removability | Contamination stain on adherend | weathering resistance | |
| Carbon-arc | | | | re-movability | Contamination stain on adherend |
| Example 3 | good | good | not occured | good | not occured |
| Example 4 | good | good | not occured | good | not occured |
| Example 5 | good | good | not occured | good | not occured |

TABLE 4-continued

| Carbon-arc | No exposure | | | 300 h (rain 60 h) exposure | |
| --- | --- | --- | --- | --- | --- |
| | | | | weathering resistance | |
| | Adhesive property at low temp. | High-speed re-movability | Contamination stain on adherend | re-re-movability | Contamination stain on adherend |
| Example 6 | good | good | not occured | good | not occured |
| Example 7 | good | good | not occured | good | not occured |
| Example 8 | good | good | not occured | good | not occured |
| Comparative example 4 | poor | good | not occured | good | not occured |
| Comparative example 5 | poor | good | not occured | good | not occured |
| Comparative example 6 | poor | poor | occured | poor | occured |
| Comparative example 7 | good | poor | not occured | poor | occured |
| Comparative example 8 | good | poor | occured | poor | occured |
| Comparative example 9 | poor | good | not occured | good | not occured |
| Comparative example 10 | poor | good | not occured | good | not occured |
| Comparative example 11 | good | good | occured | good | occured |

As is clear from results of Examples 3–8 in Table 4, the pressure-sensitive adhesive sheets for surface protection for using at low temperature, in which the adhesive compositions of the present invention have been employed, had good adhesive property at low temperature to a hardly adhesive coat, and small removal strengths. Further, they were also easy to remove the sheet after carbon-arc exposure, and they had never contaminated surfaces of adherends or left any stain thereon.

On the other hand, where the adhesive composition comprises a polyisobutylene without a tackifier being contained therein, as in comparative example 4, it exhibits poor adhesive property at low temperature to a hardly adhesive coat.

Also, where the adhesive composition consists of a blend of a polyisobutylene and a polybutene without a tackifier being contained therein, as in comparative example 5, it exhibits poor adhesive property at low temperature to a hardly adhesive coat.

Where the adhesive composition comprises more than 30 parts by weight of a rosin resin tackifier to 100 parts by weight of a blend consisting of a polyisobutylene and a polybutene, as in comparative example 6, it exhibits poor adhesive property at low temperature, removability at high-speed and weathering resistance, or contaminates surfaces of adherends.

Where the ratio of a polybutene to the blend in the adhesive composition exceeds 50% by weight, as in comparative example 7, it exhibits poor removability at high-speed and weathering resistance.

Where the adhesive composition does not include a polyisobutylene and has been added only a tackifier to a polybutene, as in comparative example 8, it exhibits poor removability at high-speed and weathering resistance or contaminates surfaces of adherends.

Where employed is not a rosin resin but a terpene resin as a tackifier in the adhesive composition, as in comparative example 9, it exhibits poor adhesive property at low temperature to a hardly adhesive coat.

Where employed is not a rosin resin but a petroleum resin as a tackifier in the adhesive composition, as in comparative example 10, it exhibits poor adhesive property at low temperature to a hardly adhesive coat.

Where employed is not a rosin resin but a terpene phenol resin as a tackifier in the adhesive composition, as in comparative example 11, it exhibits poor weathering resistance or contaminates surfaces of adherends.

INDUSTRIAL APPLICABILITY

The pressure-sensitive adhesive sheet for surface protection of the present invention exhibits good protection function to a hardly adhesive coat at both of normal and low temperatures, and has never peeled partially or completely due to cut or tear at the time of low-temperature transport. Further, the pressure-sensitive adhesive sheet for surface protection of the present invention has good application workability, removal workability and weathering resistance and therefore is easily removable at high-speed without cut or tear even after the carbon-arc exposure.

The adhesive composition of the present invention is to provide a pressure-sensitive adhesive sheet for surface protection where removal strength at high-speed is small and adhesive property at low temperature to hardly adhesive coats has been improved by incorporating a polybutene and a rosin resin tackifier in amounts within the predetermined ranges into a polyisobutylene and/or a butyl rubber where removal strength at high-speed removal is small but the adhesive property to adhesive-retarded coats is poor.

What is claimed is:

1. A pressure-sensitive adhesive sheet for surface protection, which comprises a substrate containing an ethylene/propylene copolymer and an ethylene/1-butene copolymer in a weight ratio of 60:40 to 90:10, wherein said substrate has a light transmittance at 200 to 400 nm of 0.5% or less.

2. A pressure-sensitive adhesive sheet for surface protection, which comprises a substrate containing an ethylene/propylene copolymer and an ethylene/1-butene copolymer in a weight ratio of 60:40 to 90:10, wherein said ethylene/propylene copolymer has a melt flow rate measured at 230° C. under a load of 2.16 kg of 0.5 to 5 g/10 min.

3. A pressure-sensitive adhesive sheet for surface protection, which comprises a substrate containing an ethylene/propylene copolymer and an ethylene/1-butene copolymer in a weight ratio of 60:40 to 90:10, wherein said ethylene/1-butene copolymer has a melt flow rate measured at 190° C. under a load of 2.16 kg of 0.1 to 20 g/10 min.

4. An adhesive composition for pressure-sensitive adhesive sheets for surface protection, which comprises 5 to 30 parts by weight of a rosin resin tackifier based on 100 parts by weight of a blend comprising 50 to 100% by weight of a polyisobutylene and/or a butyl rubber and 50 to 0% by weight of a polybutene.

5. The adhesive composition according to claim 4, wherein said rosin resin tackifier is a hydrogenated rosin ester resin.

6. The adhesive composition according to claim 4, wherein the adhesive strength at −20° C. atmosphere (180° peel strength, removal rate 0.3 m/min) is 0.4 N/10 mm or more and the removal strength at high-speed at 23° C. atmosphere (180° peel strength, pretreatment 70° C.×24 hours, peeling rate 40 m/min) is less than 2 N/10 mm, to a hardly adhesive coat of which wetting property is less than 30 dyn/cm.

7. The adhesive composition according to claim 4, wherein said polyisobutylene and/or butyl rubber have a viscosity-average molecular weight of 400,000 to 1,500,000.

8. The adhesive composition according to claim 4, wherein said polybutene has a number-average molecular weight of 400 to 3,000.

9. A pressure-sensitive adhesive sheet for surface protection, which comprises:

a substrate comprising an ethylene/propylene copolymer and an ethylene/1-butene copolymer in a weight ratio of 60:40 to 90:10; and an adhesive layer formed on said substrate, which comprises 100 parts by weight of a blend comprising 50 to 100% by weight of a polyisobutylene and/or a butyl rubber and 50 to 0% by weight of a polybutene and 5 to 30 parts by weight of a rosin resin tackifier.

\* \* \* \* \*